(12) United States Patent
Koike

(10) Patent No.: US 11,699,049 B2
(45) Date of Patent: Jul. 11, 2023

(54) WIRELESS TAG COMMUNICATION DEVICE AND SHEET PROCESSING APPARATUS

(71) Applicant: TOSHIBA TEC KABUSHIKI KAISHA, Tokyo (JP)

(72) Inventor: Yuki Koike, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 69 days.

(21) Appl. No.: 17/325,121

(22) Filed: May 19, 2021

(65) Prior Publication Data

US 2022/0021771 A1    Jan. 20, 2022

(30) Foreign Application Priority Data

Jul. 16, 2020 (JP) ................. 2020-122404

(51) Int. Cl.
  *G06K 7/10*     (2006.01)
  *G06K 19/077*   (2006.01)
  *H04N 1/024*    (2006.01)

(52) U.S. Cl.
  CPC ..... *G06K 7/10435* (2013.01); *G06K 7/10316* (2013.01); *G06K 7/10356* (2013.01);
  (Continued)

(58) Field of Classification Search
  CPC ........... G06K 7/10435; G06K 7/10316; G06K 7/10356; G06K 7/10366; G06K 19/07773;
  (Continued)

(56) References Cited

U.S. PATENT DOCUMENTS 7,187,339 B2 *  3/2007  Mori ................... H01Q 9/0442
                                                 343/768
7,327,265 B2    2/2008  Tsujimura et al.
(Continued)

FOREIGN PATENT DOCUMENTS

JP       2005-311994 A    11/2005

OTHER PUBLICATIONS

Extended European Search Report dated Mar. 17, 2022 in corresponding European Patent Application No. 21180807.6, 9 pages.

*Primary Examiner* — Seung H Lee
(74) *Attorney, Agent, or Firm* — Kim & Stewart LLP

(57) ABSTRACT

A wireless tag communication device for communicating with a wireless tag conveyed by a conveyance mechanism, includes radiation regions from which a radio wave is emitted. The radiation regions include a first region extending along a first direction crossing a conveyance direction of the tag and having a first length in the first direction, a second region extending along the first direction and having a second length in the first direction, a third region extending along the conveyance direction and having a third length in the conveyance direction, and a fourth region extending along the conveyance direction and having a fourth length in the conveyance direction. The device further includes a controller configured to cause at least one of the first, second, third and, fourth regions to emit a polarized wave towards the tag. Each of the first and second regions partially overlaps the third and fourth regions.

20 Claims, 11 Drawing Sheets

(52) U.S. Cl.
CPC ... *G06K 7/10366* (2013.01); *G06K 19/07773* (2013.01); *H04N 1/02472* (2013.01)

(58) Field of Classification Search
CPC ........... G06K 7/10425; G06K 17/0025; G06K 19/0723; H04N 1/02472; H01Q 1/2208; H01Q 1/38; G03G 21/1896; G03G 15/5016; H04B 1/40
See application file for complete search history.

(56) References Cited

U.S. PATENT DOCUMENTS

2010/0303531 A1   12/2010   Fessler et al.
2015/0242667 A1   8/2015    Torchalski et al.

\* cited by examiner

WIRELESS TAG COMMUNICATION DEVICE AND SHEET PROCESSING APPARATUS

CROSS-REFERENCE TO RELATED APPLICATION

This application is based upon and claims the benefit of priority from Japanese Patent Application No. 2020-122404, filed Jul. 16, 2020, the entire contents of which are incorporated herein by reference.

FIELD

Embodiments described herein relate generally to a wireless tag communication device and a sheet processing apparatus.

BACKGROUND

There is an image forming apparatus that forms an image on a sheet on which a wireless tag, such as a radio frequency identifier (RFID), is attached. Such an image forming apparatus has an antenna capable of transmitting and receiving a radio wave to exchange information with the wireless tag. The antenna radiates a radio wave that can be received the wireless tag. More particularly, the radio wave emitted from the antenna needs to have a polarization plane that matches a polarization plane that can be received by the wireless tag. In addition, the radio wave needs to have a frequency within a frequency band that can be received by the wireless tag.

However, there are various different types of wireless tags that can be attached to a sheet. For example, the typical frequency band that can be received by a wireless tag may vary from country to country according to local standards or protocols. In such a case, an image forming apparatus capable of radiating radio waves only in a particular frequency band used in a specific country may not be able to communicate with a wireless tag used in another country. The differences in the types of usable wireless tags are not just dependent on the end-use country, and differences may also exist according to end-use application environments which may vary region to region even within a country. Such a problem associated with different potential wireless tag types may be more broadly found in any apparatus for processing a sheet or wireless tags.

DETAILED DESCRIPTION

Figure 1:
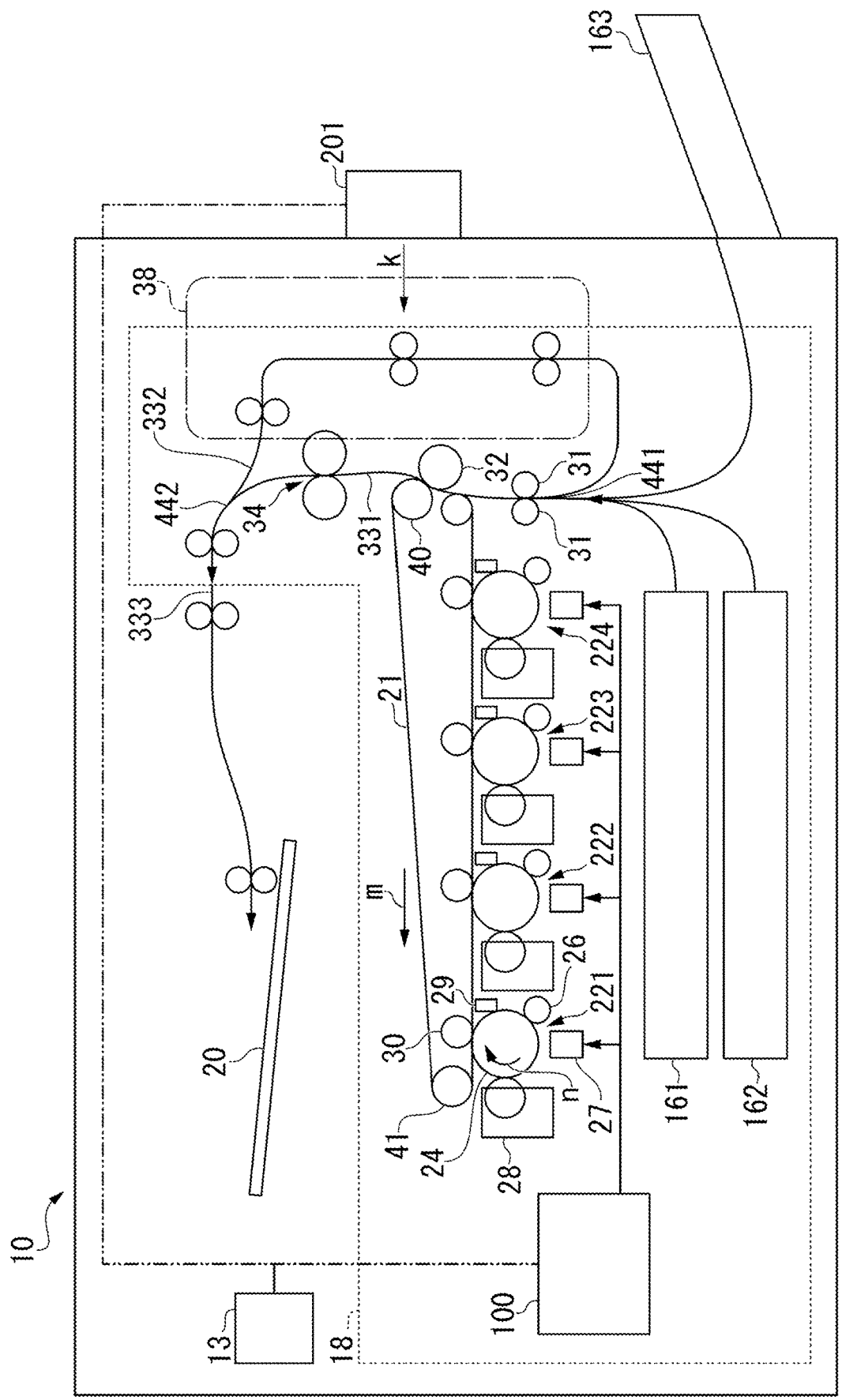
FIG. 1 is a diagram illustrating an image forming apparatus according to an embodiment.

Embodiments provide a wireless tag communication device and a sheet processing apparatus that can exchange information with a wide variety wireless tag types.

In general, according to one embodiment, a wireless tag communication device for communicating with a wireless tag being conveyed by a conveyance mechanism includes an antenna with a plurality of radiation regions or elements from which a polarized radio wave can be emitted. The radiation regions include a first radiation region extending along a first direction crossing a conveyance direction of the wireless tag and having a first length in the first direction, a second radiation region extending along the first direction and having a second length that is different from the first length in the first direction, a third radiation region extending along the conveyance direction and having a third length in the conveyance direction, and a fourth radiation region extending along the conveyance direction and having a fourth length that is different from the third length in the conveyance direction. The device further comprises a controller configured to cause at least one of the first, second, third and, fourth radiation regions to emit a polarized wave towards the wireless tag. Each of the first and second radiation regions partially overlaps both the third radiation region and the fourth radiation region.

Hereinafter, a wireless tag communication device and a sheet processing apparatus according to one or more embodiments will be described with reference to the drawings.

In the following description, the same reference numerals are used to identify like features. The duplicated description of repeated features may be omitted.

FIG. 1 is a diagram illustrating an image forming apparatus 10 according to an embodiment. The image forming apparatus 10 is also referred to as a sheet processing apparatus or an image processing apparatus.

In FIG. 1, the image forming apparatus 10 includes a control panel 13, a wireless tag communication device 201, and a printer unit 18. The printer unit 18 includes a control unit 100, paper feed cassettes 161 and 162, and the like. The control unit 100 is a control circuit or a controller configured to control the control panel 13, the wireless tag communication device 201, and the printer unit 18. The control unit 100 controls conveyance of a sheet in the printer unit 18. The control of the sheet conveyance includes controlling a sheet conveyance timing, a sheet stop position, a sheet conveyance speed, and the like.

The control panel 13 includes an input key and a display unit. For example, the input key receives input from a user. For example, the display unit is a touch panel type. The display unit in such a case receives input from the user and displays information to the user according to the input(s). For example, the control panel 13 displays items related to an operation of the image forming apparatus 10 on the display unit. The control panel 13 notifies the control unit 100 of the items selected by the user.

The paper feed cassettes 161 and 162 accommodate sheets on which a wireless tag can be attached. The paper feed cassettes 161 and 162 can also accommodate a sheet on which a wireless tag is not attached. In the following description, unless otherwise specified, the sheet is provided with a wireless tag. A material such as paper or a plastic film is used for the sheet.

The printer unit 18 performs an image forming operation. For example, the printer unit 18 forms an image indicated by image data on a sheet. In the following description, forming of an image on a sheet is simply referred to as printing. The printer unit 18 includes an intermediate transfer belt 21. The intermediate transfer belt 21 is supported by a driven roller 41, a backup roller 40, and the like. The printer unit 18 rotates the intermediate transfer belt 21 in a direction of arrow m shown in FIG. 1.

The printer unit 18 includes four sets of image forming stations 221, 222, 223, and 224. The image forming stations 221, 222, 223 and 224 are used for image forming of Y (yellow), M (magenta), C (cyan), and K (black), respectively. The image forming stations 221, 222, 223, and 224 are arranged below the intermediate transfer belt 21 along the intermediate transfer belt 21.

Hereinafter, among the image forming stations 221, 222, 223, and 224, the Y (yellow) image forming station 221 will be described as an example. Since the image forming stations 222, 223, and 224 have substantially the same configuration as the image forming station 221, detailed description thereof will be omitted.

The image forming station 221 includes an electrostatic charger 26, an exposure scanning head 27, a developing device 28, and a photoreceptor cleaner 29. The electrostatic charger 26, the exposure scanning head 27, the developing device 28, and the photoreceptor cleaner 29 are arranged around a photoreceptor drum 24 that rotates in a direction of arrow n.

The image forming station 221 includes a primary transfer roller 30. The primary transfer roller 30 faces the photoreceptor drum 24 via the intermediate transfer belt 21.

The image forming station 221 charges the photoreceptor drum 24 with the electrostatic charger 26 and then selectively exposes the photoreceptor drum 24 with the exposure scanning head 27. The image forming station 221 thus forms an electrostatic latent image on the photoreceptor drum 24. The developing device 28 develops the electrostatic latent image on the photoreceptor drum 24 using a two-component developer formed of a toner and a carrier.

The primary transfer roller 30 primarily transfers a toner image formed on the photoreceptor drum 24 onto the intermediate transfer belt 21. Each of the image forming stations 221, 222, 223, and 224 forms a color toner image on the intermediate transfer belt 21 by the primary transfer roller 30. The color toner image is formed by sequentially superimposing toner images of Y (yellow), M (magenta), C (cyan), and K (black). The photoreceptor cleaner 29 removes the toner remaining on the photoreceptor drum 24 after the primary transfer.

The printer unit 18 includes a secondary transfer roller 32. The secondary transfer roller 32 faces a backup roller 40 via the intermediate transfer belt 21. The secondary transfer roller 32 collectively and secondarily transfers the color toner image on the intermediate transfer belt 21 onto the sheet. In the following description, the term "toner image" may be either a color toner image or a toner image of only one color. The toner image may be a toner image using decolorable toner.

A conveyance path 331 is a conveyance path of the sheet extending from a confluence portion 441 to a branch portion 442. A conveyance path 332 is a conveyance path that passes through a double-sided printing device 38 and extends from the branch portion 442 to the confluence portion 441. A conveyance path 333 is a conveyance path of the sheet extending from the branch portion 442 to a paper discharge tray 20.

The tip of the sheet picked up from a paper feed cassette 161, a paper feed cassette 162, or a manual feed tray 163 is abutted against a portion where two stopped registration rollers 31 are in contact with each other. An inclination of the sheet abutted against the registration roller 31 is corrected. The control unit 100 starts rotation of the registration roller 31 according to a position of the toner image on the rotating intermediate transfer belt 21 and moves the sheet to the secondary transfer roller 32. The control unit 100 controls the secondary transfer roller 32 to secondarily transfer the toner image formed on the intermediate transfer belt 21 to the sheet. The control unit 100 causes the sheet to be conveyed along the conveyance path 331 and controls a fixing device 34 to form and fix a toner image onto the sheet. The control unit 100 causes the sheet to be discharged via the conveyance path 333.

In the case of double-sided printing, the control unit 100 causes the sheet on which an image formed to be conveyed through the conveyance path 333. After the entire sheet passes through the branch portion 442, the control unit 100 causes the sheet to be switched back and conveyed through the conveyance path 332. After that, the control unit 100 causes the sheet to be conveyed through the double-sided printing device 38, the confluence portion 441, the registration roller 31, and the conveyance path 331. Then, the control unit 100 controls the fixing device 34 to form and fix an image onto the back surface of the sheet. The control unit 100 causes the sheet to be discharged through the conveyance path 333.

The wireless tag communication device 201 can communicate with the control unit 100. The wireless tag communication device 201 reads information from the wireless tag and writes information to the wireless tag by communicating with the wireless tag on the sheet. The wireless tag communication device 201 transmits a signal towards a direction of arrow k shown in FIG. 1. The signal is specifically a modulated radio wave. Information is written to the wireless tag of the sheet by the signal transmitted by the wireless tag communication device 201.

When an image is formed in the printer unit 18, an electrostatic latent image is formed on the photoreceptor drum 24 by the exposure scanning head 27 before secondarily transferred by the secondary transfer roller 32. The electrostatic latent image formed on the photoreceptor drum is primarily transferred to the intermediate transfer belt 21 as a toner image. Furthermore, the toner image primarily transferred to the intermediate transfer belt 21 is secondarily transferred to the wireless tag sheet conveyed to the registration roller 31.

Next, a functional block diagram of the image forming apparatus 10 will be described with reference to FIG. 2.

Figure 2:
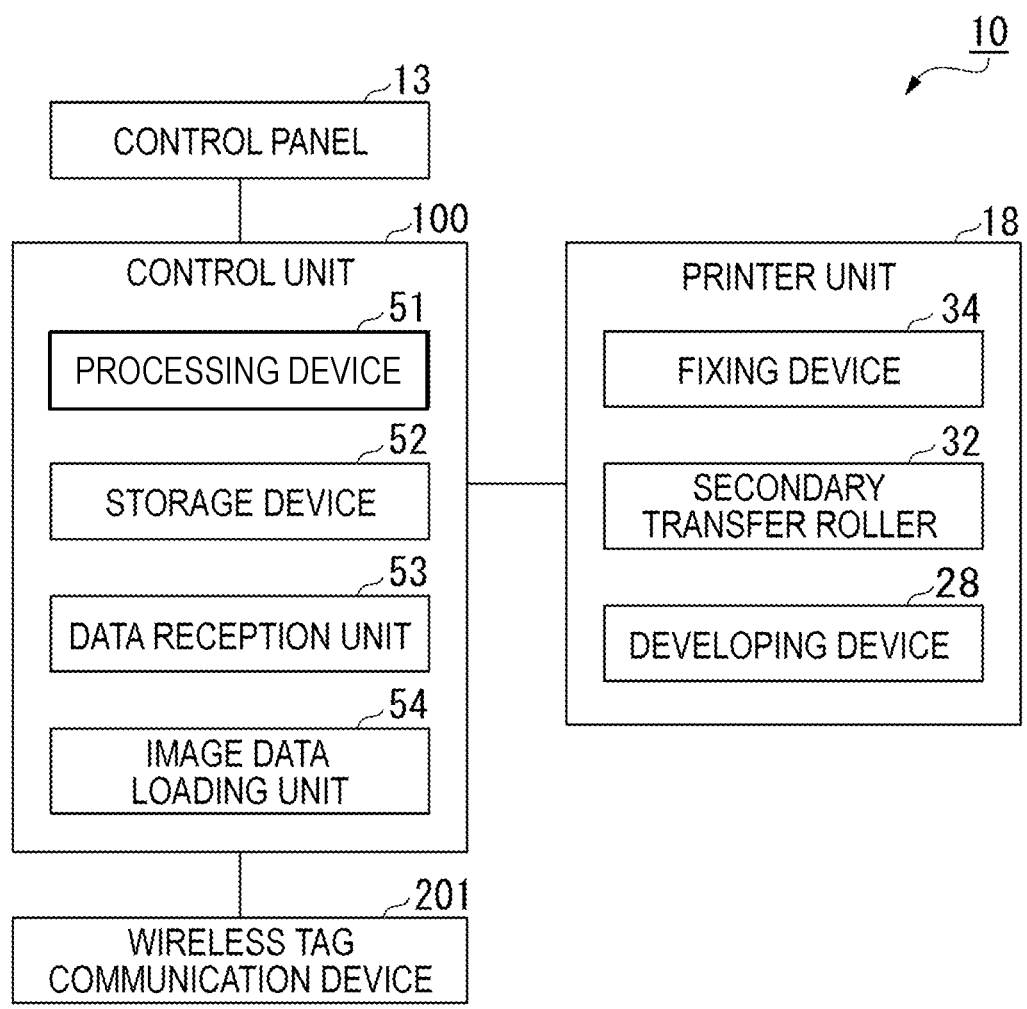
FIG. 2 is a functional block diagram of an image forming apparatus.

In FIG. 2, the image forming apparatus 10 includes the control unit 100, the control panel 13, the printer unit 18, and the wireless tag communication device 201.

The control unit 100 includes a processing device 51 (e.g., a processor) and a storage device 52. The processing device 51 controls the control panel 13, the printer unit 18, and the wireless tag communication device 201 according to an image processing program stored in the storage device 52. The control unit 100 outputs conveyance start information indicating that the sheet conveyance has been started.

The processing device 51 is, for example, a central processing unit (CPU), an application specific integrated circuit (ASIC), or the like.

The storage device 52 is a read only memory (ROM), a random access memory (RAM), a hard disk drive (HDD), a solid-state drive (SSD), or the like.

A data reception unit 53 receives, from a host, print data (for example, data described in a page description language) indicating an image to be printed. The host in this context is, for example, a personal computer (PC). The data reception unit 53 stores the print data received from the host in the storage device 52.

An image data loading unit 54 converts the stored print data to data (for example, raster data) that can be printed by the printer unit 18 according to the printing parameters for the print data, and stores the converted data in the storage device 52.

The printer unit 18 includes the fixing device 34, the secondary transfer roller 32, and the developing device 28. The printer unit 18 forms an image on a sheet based on the converted data stored in the storage device 52.

Figure 3:
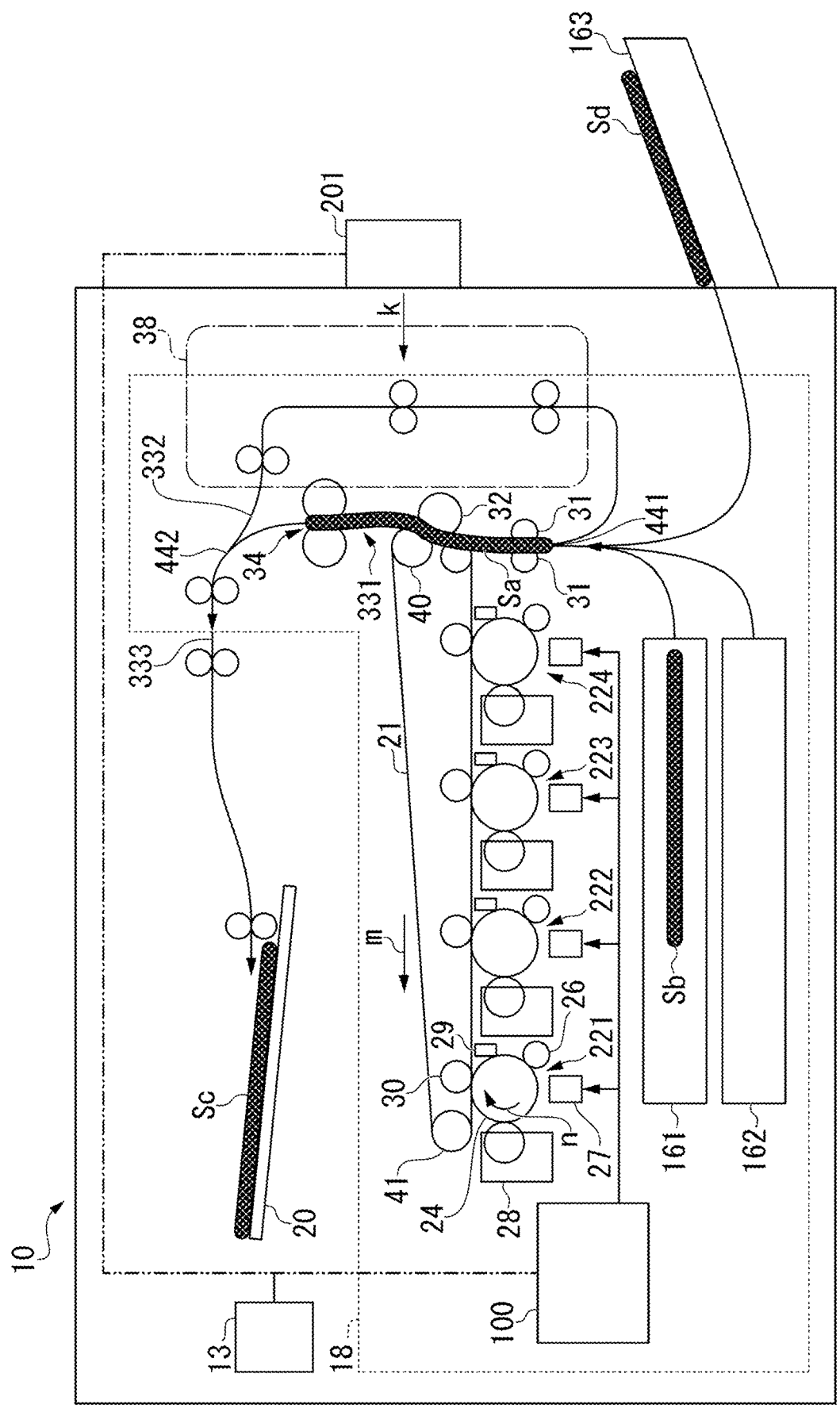
FIG. 3 is a diagram illustrating locations of a sheet in an image forming apparatus.

FIG. 3 is a diagram illustrating potential locations of a sheet in the image forming apparatus 10. In FIG. 3, a sheet Sb is a sheet placed in the paper feed cassette 161. A sheet Sc is a sheet placed on the paper discharge tray 20. A sheet Sd is a sheet placed on the manual feed tray 163.

The sheet Sa is a sheet being conveyed along the conveyance path 331. The wireless tag is provided on each sheet.

In FIG. 3, the sheet (hereinafter, also referred to as "target sheet") on which information is to be written to the wireless tag is a sheet being conveyed along the conveyance path 331. Thus, the sheet Sa is the target sheet.

In the state illustrated in FIG. 3, the wireless tag communication device 201 transmits a signal towards the direction of arrow k. That is, the k-direction is a transmission direction of the signal transmitted by the wireless tag communication device 201. For that reason, the k-direction is also a propagation direction of the radio wave radiated by the wireless tag communication device 201.

Each wireless tag that receives the signal operates according to the received signal. The wireless tag stores, for example, information indicated by the received signal. The wireless tag responds to, for example, the wireless tag communication device 201. Responding specifically means transmitting a signal. The wireless tag communication device 201 receives the signal transmitted from the wireless tag provided on each sheet. In the case of FIG. 3, one of the wireless tags that receives the signal is the wireless tag provided on the sheet Sa. In FIG. 3, the sheet Sa is being conveyed.

The wireless tag has a rectangular shape in a plane perpendicular to the k-direction having a longer side and a shorter side, and, when wavelengths of the radio waves are the same, a polarized wave whose polarization plane is parallel to the longer side (major axis) interacts more strongly with the wireless tag than a polarized wave whose polarization plane is perpendicular to the longer side.

Stronger interaction in this context means that the probability that the radio wave passes through the wireless tag without generating a response is low or, alternatively, the probability that the radio wave reaching the wireless tag will be absorbed or reflected by the wireless tag is high. For this reason, in the wireless tag communication device 201, a radio wave whose polarization plane is parallel to the longer side of the wireless tag is desirably used for exchanging information with the wireless tag from the viewpoint of reducing power consumption and the frequency of communication errors. A communication error in this context means that information cannot be appropriately exchanged between the wireless tag communication device 201 and the wireless tag.

Figure 4:
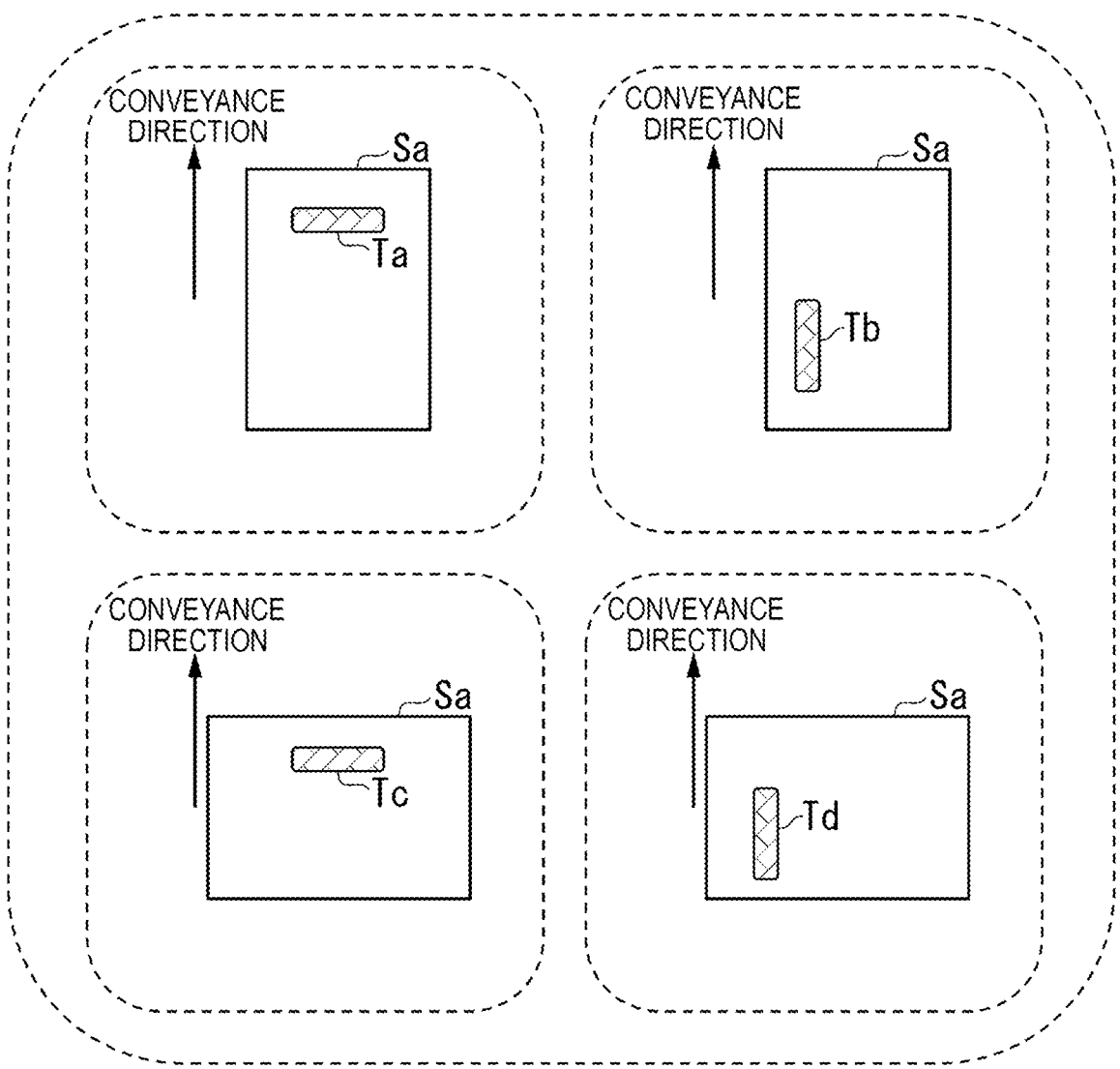
FIG. 4 is a diagram illustrating relationships between a location of a wireless tag on a sheet and a conveyance direction of the sheet.

FIG. 4 is a diagram illustrating relationships between a location of a wireless tag on a sheet and a conveyance direction of the sheet. In FIG. 4, each of wireless tags Ta, Tb, Tc, and Td is provided on the sheet Sa being conveyed along the conveyance path 331. The tag Ta is an example of the wireless tag provided on the sheet Sa so that the longer side of the tag Ta is perpendicular to the conveyance direction and perpendicular to the longer side of the paper surface. The tag Tb is an example of the wireless tag provided on the sheet Sa so that the longer side of the tag Tb is parallel to the conveyance direction and parallel to the longer side of the sheet Sa. The tag Tc is an example of the wireless tag provided on the sheet Sa so that the longer side of the tag Tc is perpendicular to the conveyance direction and parallel to the longer side of the sheet Sa. The tag Td is an example of the wireless tag provided on the sheet Sa so that the longer side of the tag Td is parallel to the conveyance direction and perpendicular to the longer side of the sheet Sa. Although FIG. 4 illustrates an example in which one wireless tag is arranged on one sheet, a plurality of radio tags may be arranged on one sheet.

The sheet conveyance direction is, for example, a direction perpendicular to the k-direction in FIG. 3 and a direction from the bottom to the top on the paper surface of FIG. 3. Since the wireless tag is provided on the sheet, the sheet conveyance direction is also the wireless tag conveyance direction.

Figure 5:
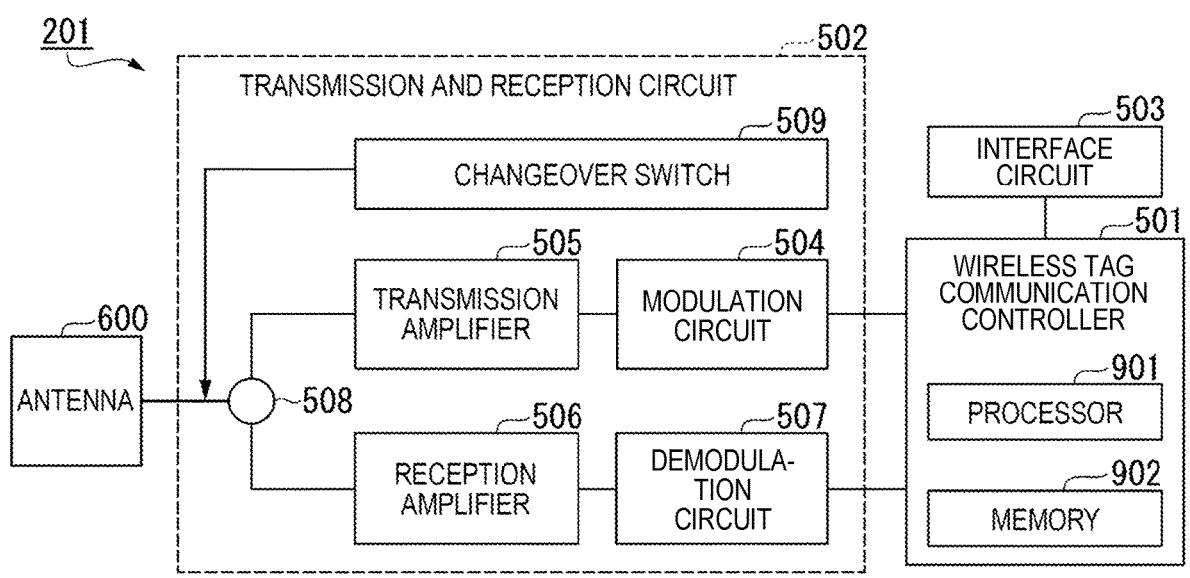
FIG. 5 is a diagram illustrating a wireless tag communication device.

FIG. 5 is a diagram illustrating the wireless tag communication device 201.

The wireless tag communication device 201 includes an antenna 600, a wireless tag communication controller 501, a transmission and reception circuit 502, and an interface circuit 503.

The antenna 600 transmits a signal. The antenna 600 receives an incoming signal. The carrier of the signal transmitted by the antenna 600 is a radio wave. The carrier of the signal received by the antenna 600 is a radio wave.

The wireless tag communication controller 501 includes a processor 901 such as a CPU and a memory 902. The processor 901 of the wireless tag communication controller 501 executes a program(s) stored in the memory 902. The wireless tag communication controller 501 controls the operation of each circuit or unit included in the wireless tag communication device 201. A write threshold value (e.g., a signal strength value below which writing is not attempted) can be stored in the memory 902 in advance.

The wireless tag communication controller 501 receives, for example, sheet conveyance start information. The wireless tag communication controller 501 controls transmission of a signal by controlling each circuit included in the wireless tag communication device 201, for example. The wireless tag communication controller 501 causes the signal received by the antenna 600 to be demodulated, for example, by controlling each circuit included in the wireless tag communication device 201. The wireless tag communication controller 501 measures, for example, the elapsed time since receiving the conveyance start information.

The transmission and reception circuit 502 includes a modulation circuit 504, a transmission amplifier 505, a reception amplifier 506, a demodulation circuit 507, a circulator 508, and a changeover switch 509.

The modulation circuit 504 modulates the radio wave radiated by the wireless tag communication device 201. More specifically, a voltage modulated by the control of the wireless tag communication controller 501 is applied to the modulation circuit 504, and the modulation circuit 504 generates a modulated current by application of the voltage. After the current generated by the modulation circuit 504 flows through the transmission amplifier 505, the antenna 600 transmits the radio wave. As described above, the radio wave is modulated by the modulation circuit 504 and radiated from the antenna 600, and therefore the transmitted radio wave from antenna 600 incorporates a signal to be transmitted by the wireless tag communication device 201.

The transmission amplifier 505 controls intensity of the signal transmitted by the wireless tag communication device 201. The circulator 508 separates the signal transmitted by the antenna 600 from the signal received by the antenna 600.

The changeover switch 509 switches a voltage application destination, that is, the target to which the current modulated by the modulation circuit 504 and amplified by the transmission amplifier 505 flows. Specifically, the changeover switch 509 switches a connection destination of the transmission amplifier 505 to one of power-feeding lines 641 and 642, which will be described later. The changeover switch 509 is a radio frequency (RF) switch such as a single pole double throw switch. The operation of the changeover switch 509 is controlled by the wireless tag communication controller 501. The changeover switch 509 switches, under the control of the wireless tag communication controller 501, the voltage application destination.

The reception amplifier 506 controls the intensity of the signal received by the antenna 600 to a predetermined intensity. The demodulation circuit 507 demodulates the signal received by the antenna 600.

The interface circuit 503 is a circuit that electrically connects the wireless tag communication controller 501 and the control unit 100.

Figure 6:
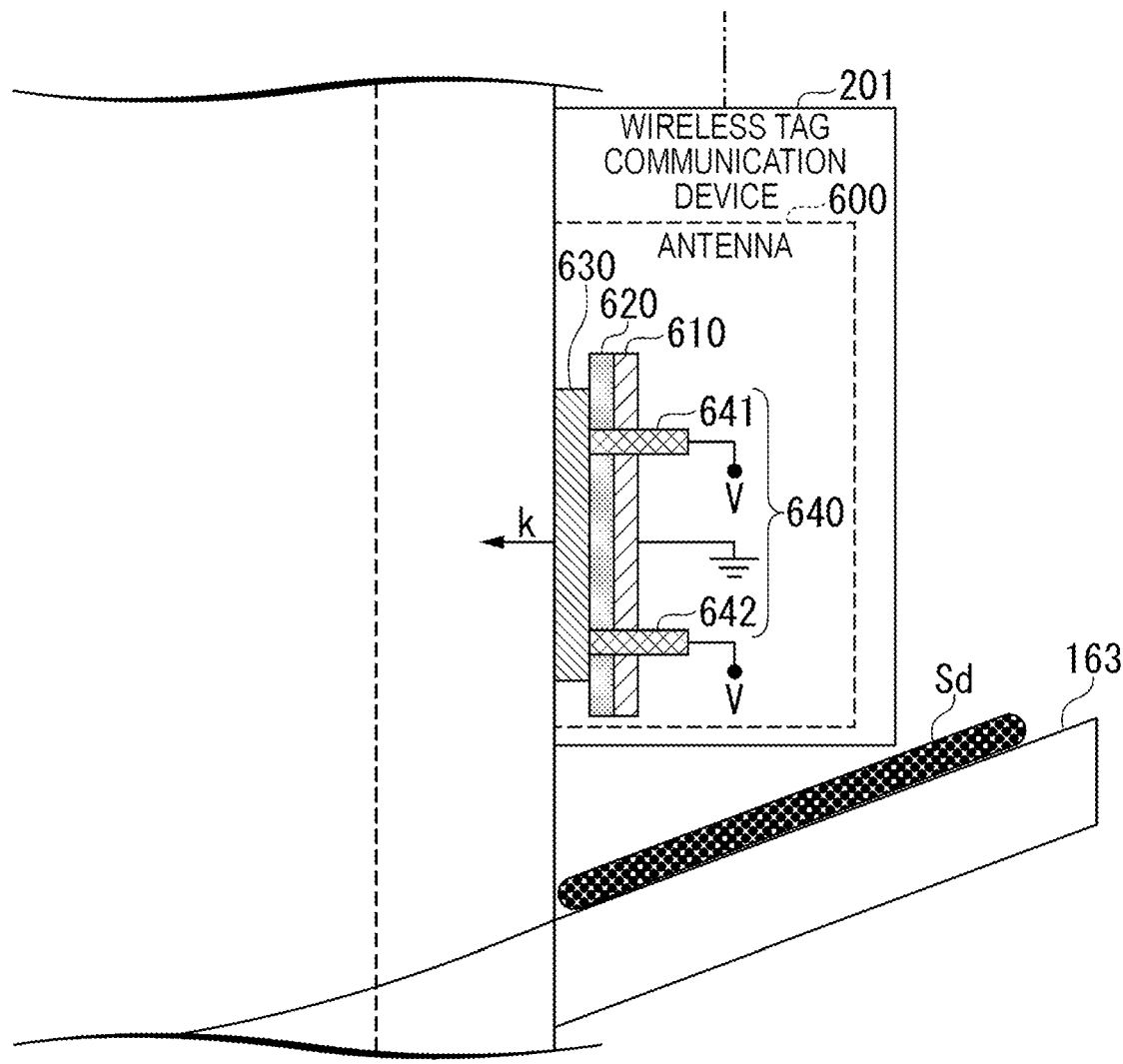
FIG. 6 is a diagram illustrating a side view of an antenna.

FIG. 6 is a diagram illustrating a side view of the antenna 600. The antenna 600 is a microstrip antenna including a ground conductor plate 610, a dielectric substrate 620, and a radiation element 630. The ground conductor plate 610 is a grounded conductor. The dielectric substrate 620 is a dielectric material in contact with the ground conductor plate 610.

The radiation element 630 is a conductor positioned on a side of the dielectric substrate 620 on which the ground conductor plate 610 is not disposed, and is a conductor in contact with the dielectric substrate 620. The radiation element 630 is connected to the power-feeding lines 641 and 642 penetrating the dielectric substrate 620 and the ground conductor plate 610. The power-feeding lines 641 and 642 are conductive wires. When a voltage is applied through either of the power-feeding lines 641 and 642, the radiation element 630 radiates the radio wave generated by the current generated by the applied voltage. The radiated radio wave is a signal. A wave vector of the radio wave radiated by the radiation element 630 is the vector directed towards the k-direction. Hereinafter, when the power-feeding line 641 and the power-feeding line 642 are not distinguished, the power-feeding lines 641 and 642 are referred to as a power-feeding line 640. One end of the power-feeding line 640 not in contact with the radiation element 630 is connected to the changeover switch 509.

For the sake of simplicity, a plane perpendicular to the k-direction is referred to as an XY-plane. Two vectors on the XY-plane and orthogonal to each other a referenced in this description. One vector that is perpendicular to the conveyance direction of the sheet as conveyed on the conveyance path 331 is referred to as an X-vector. Another vector that is perpendicular to the X-vector (e.g., parallel to the conveyance direction) is referred to as a Y-vector.

Shapes of the surfaces of the radiation element 630 perpendicular to the k-direction are substantially the same regardless of the position along the k-direction. The length of the radiation element 630 in the k-direction is preferably shorter than the wavelength of the radio wave to be radiated by the radiation element 630, and particularly preferably less than one-fourth of the wavelength.

Figure 7:
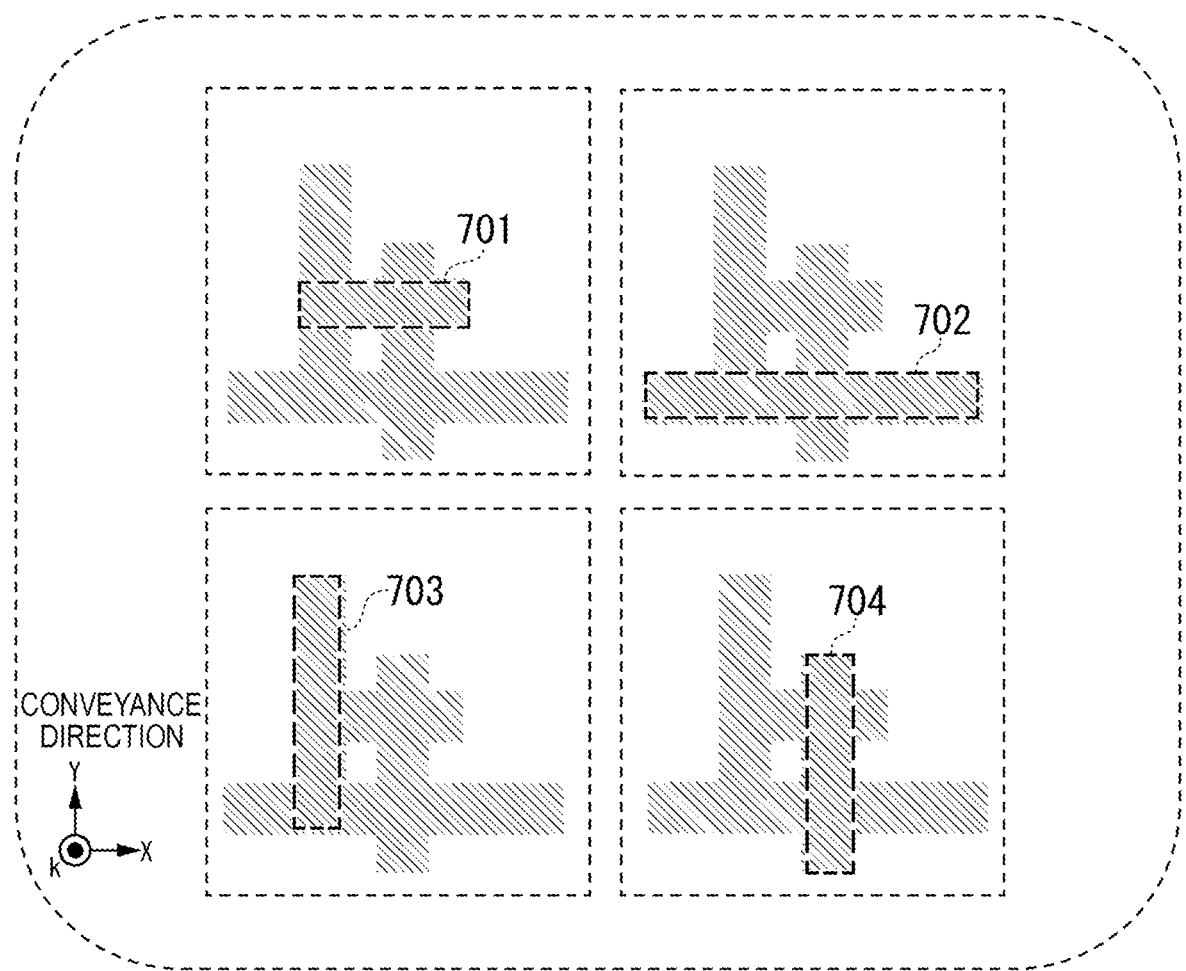
FIG. 7 is a diagram illustrating a shape of a radiation element.

FIG. 7 is a diagram illustrating a shape (hereinafter referred to as "radiation element shape") of the radiation element 630 in the XY-plane. The direction orthogonal to plane of the paper surface of FIG. 7 is parallel to the k-direction.

A plane (hereinafter referred to as a "radiation element plane") surrounded by the radiation element shape has a first radiation region 701, a second radiation region 702, a third radiation region 703, and a fourth radiation region 704. That is, the first radiation region 701, the second radiation region 702, the third radiation region 703, and the fourth radiation region 704 are positioned in the same plane. The first radiation region 701 and the second radiation region 702 are regions having a shape that satisfies the condition that the length in the direction of the X-vector is longer than the length in the direction of the Y-vector. The third radiation region 703 and the fourth radiation region 704 are regions having a shape that satisfies the condition that the length in the direction of the Y-vector is longer than the length in the direction of the X-vector.

The first radiation region 701 and the second radiation region 702 are regions having different lengths in the X-vector direction, and are regions that do not come into contact or overlap each other. The first radiation region 701 shares a part with the third radiation region 703 and the fourth radiation region 704. The second radiation region 702 shares a part with the third radiation region 703 and the fourth radiation region 704.

The third radiation region 703 and the fourth radiation region 704 are regions having different lengths in the direction of the Y-vector, and are regions that do not come into contact or overlap each other. The third radiation region 703 shares a part thereof with the first radiation region 701 and the second radiation region 702. The fourth radiation region 704 shares a part thereof with the first radiation region 701 and the second radiation region 702.

Figure 8:
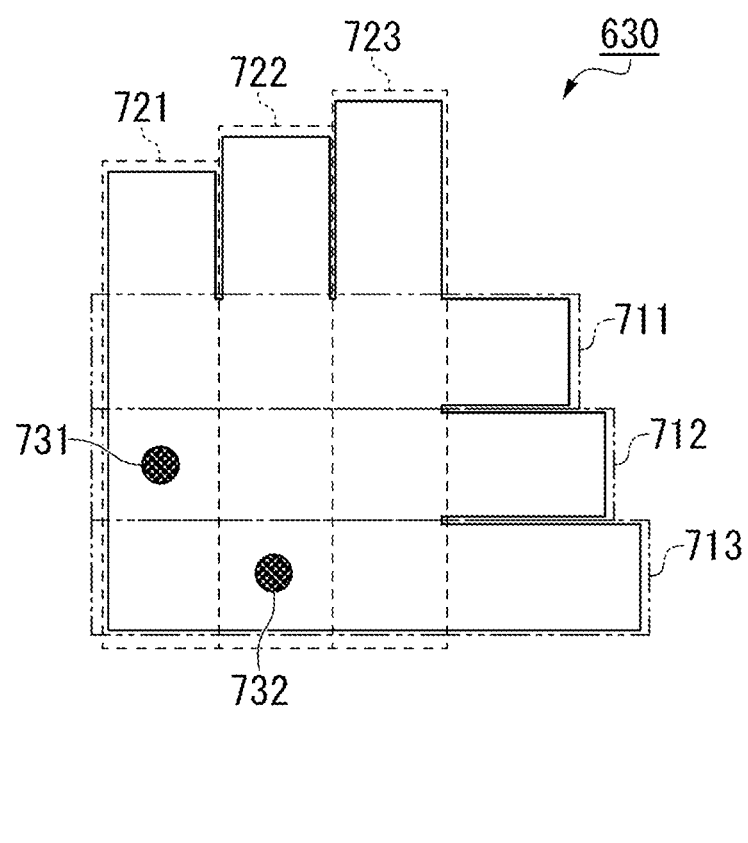
FIG. 8 is a top view illustrating a radiation element.

FIG. 8 is a top view illustrating the radiation element 630. The direction perpendicular to the paper surface of FIG. 8 is parallel to the k-direction.

A region 711 in FIG. 8 corresponds to the first radiation region 701. A region 712 in FIG. 8 corresponds to the second radiation region 702. A region 721 in FIG. 8 corresponds to the third radiation region 703. A region 722 in FIG. 8 corresponds to the fourth radiation region 704.

In FIG. 8, the radiation element plane may include the first radiation region 711, the second radiation region 712, the third radiation region 721, and the fourth radiation region 722, and may further include a first type additional region 713 and/or a second type additional region 723 in addition to the first radiation region 711, the second radiation region 712, the third radiation region 721, and the fourth radiation region 722. That is, the first radiation region 711, the second radiation region 712, the third radiation region 721, the fourth radiation region 722, the first type additional region 713, and the second type additional region 723 are positioned in the same plane.

The first type additional region 713 is a region having a shape that satisfies the condition that the length in the direction of the X-vector is longer than the length in the direction of the Y-vector, and is a region different from the first radiation region 711 and the second radiation region 712. The first type additional region 713 is a region that does not come into contact with or overlap other first type additional regions. The first type additional region 713 is a region that does not come into contact with or overlap the first radiation region 711 and the second radiation region 712. The first type additional region 713 shares a part thereof with the third radiation region 721, the fourth radiation region 722, and the second type additional region 723.

The second type additional region 723 is a region having a shape that satisfies the condition that the length in the direction of the Y-vector is longer than the length in the direction of the X-vector, and is a region different from the third radiation region 721 and the fourth radiation region 722. The second type additional region 723 is a region that does not come into contact with or overlap other second type additional regions. The second type additional region 723 is a region that does not come into contact with or overlap the third radiation region 721 and the fourth radiation region 722. The second type additional region 723 shares a part thereof with the first radiation region 711, the second radiation region 712, and the first type additional region 713.

The number of first type additional regions 713 in the radiation element plane does not need to be one, and may be two or more. The number of second type additional regions 723 in the radiation element plane does not need to be one, and may be two or more.

The radiation element 630 includes power-feeding points 731 and 732. More specifically, at the power-feeding point 731, the power-feeding line 641 and the radiation element 630 are in contact with each other, and at the power-feeding point 732, the power-feeding line 642 and the radiation element 630 are in contact with each other.

Figure 9:
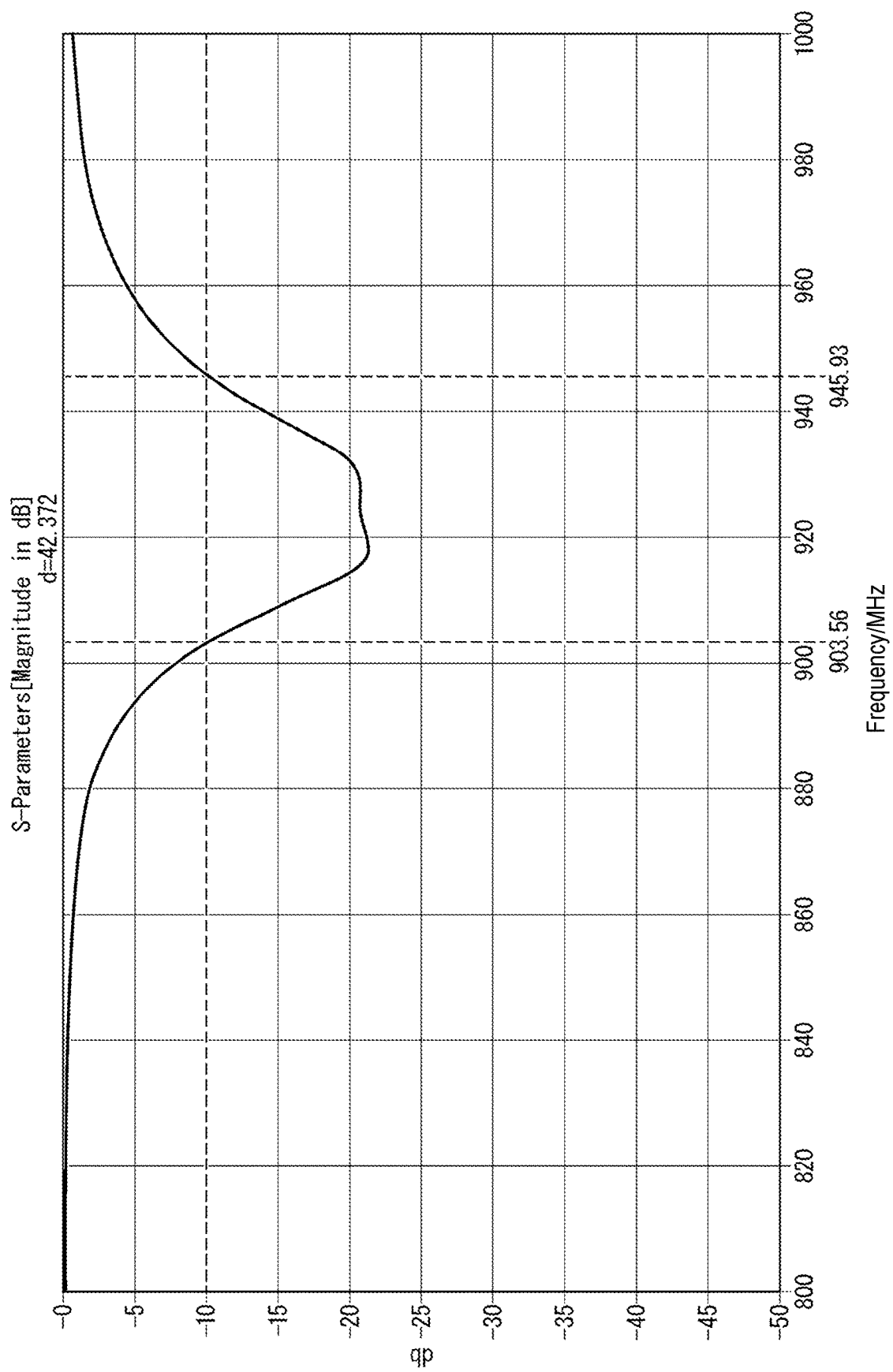
FIG. 9 is a diagram illustrating frequency response characteristics of a wireless tag communication device.
Figure 10:
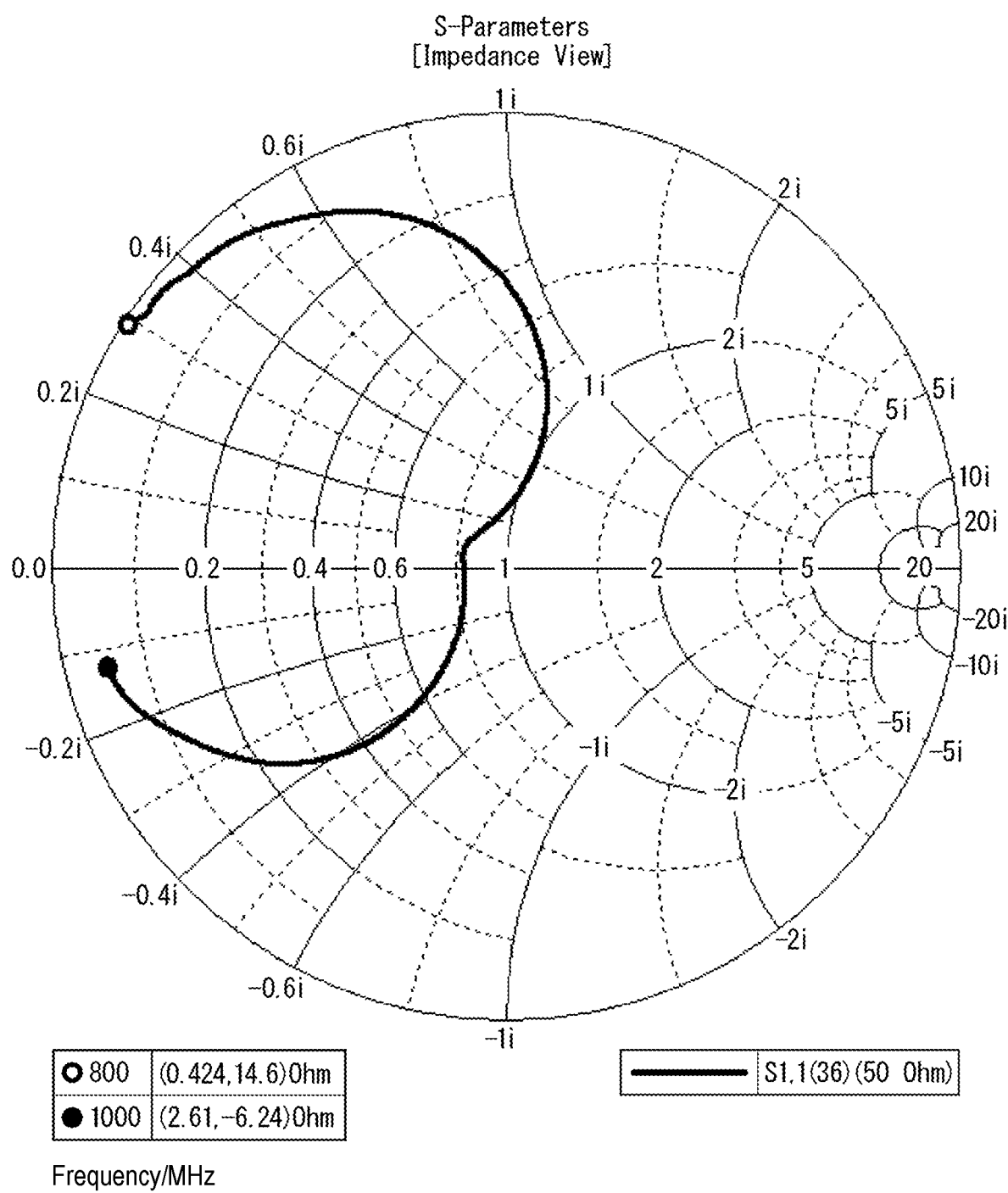
FIG. 10 is a diagram illustrating frequency response characteristics of a wireless tag communication device.

FIGS. 9 and 10 are diagrams illustrating frequency response characteristics of the wireless tag communication device 201 regarding the radio wave transmitted and received by the wireless tag communication device 201, acquired through an experiment. More specifically, FIGS. 9 and 10 are diagrams the frequency response characteristics of the wireless tag communication device 201 regarding the radio wave transmitted and received by the wireless tag communication device 201 including the radiation element 630 of FIG. 8. In particular, FIG. 10 illustrates the experimental results shown by the Smith chart. As the frequency response characteristics, values of the S parameter were measured.

In the experiment, a material of the radiation element 630 was copper. For that reason, the conductivity was $5.8 \times 10^7$ (S/m). In the experiment, the lengths of the regions 711, 712, and 713 in the direction of the X-vector were 77 mm, 72 mm, and 67 mm, respectively, and the lengths of the regions 711, 712, and 713 in the direction of the Y-vector were 10 mm, 21 mm, and 20 mm, respectively. In the experiment, the lengths of the regions 721, 722, and 723 in the direction of the X-vector were 10 mm, 21 mm, and 20 mm, respectively, and the lengths of the regions 721, 722, and 723 in the direction of the Y-vector were 67 mm, 72 mm, and 77 mm, respectively.

In the experiment, the material of the dielectric substrate 620 was flame retardant type 4 (FR4), and a dielectric constant was 4.6. The length in the k-direction was 1.53 mm. The total length of the ground conductor plate 610 and the radiation element 630 in the k-direction was 0.07 mm. In the experiment, the plane of the dielectric substrate 620 in contact with the radiation element 630 had a length of 130 mm in the direction of the X-vector and a length of 130 mm in the direction of the Y-vector.

In the experiment, the material of the ground conductor plate 610 was copper. For that reason, the conductivity was $5.8 \times 10^7$ (S/m). In the experiment, the length of the ground conductor plate 610 in the k-direction was 0.035 mm. In the experiment, the plane of the ground conductor plate 610 in contact with the dielectric substrate 620 had a length of 130 mm in the direction of the X-vector and a length of 130 mm in the direction of the Y-vector.

FIGS. 9 and 10 illustrate shows a range of approximately 42 MHz in width centered on 920 MHz where S parameter S11 is −10 dB or less.

Next, the results of an experiment (hereinafter referred to as "comparative experiment") for comparison with the results of the experiment in FIGS. 9 and 10 will be described with reference to FIG. 11. In the comparative experiment, a square patch antenna was used instead of the antenna 600. The square patch antennas used in the comparative experiment differed only in that the shape of the conductor radiating the radio wave in the XY-plane was square instead of the shape illustrated in FIG. 8. The length of one side of the shape in the XY-plane of the square patch antenna used in the comparative experiment was 75 mm.

Figure 11:
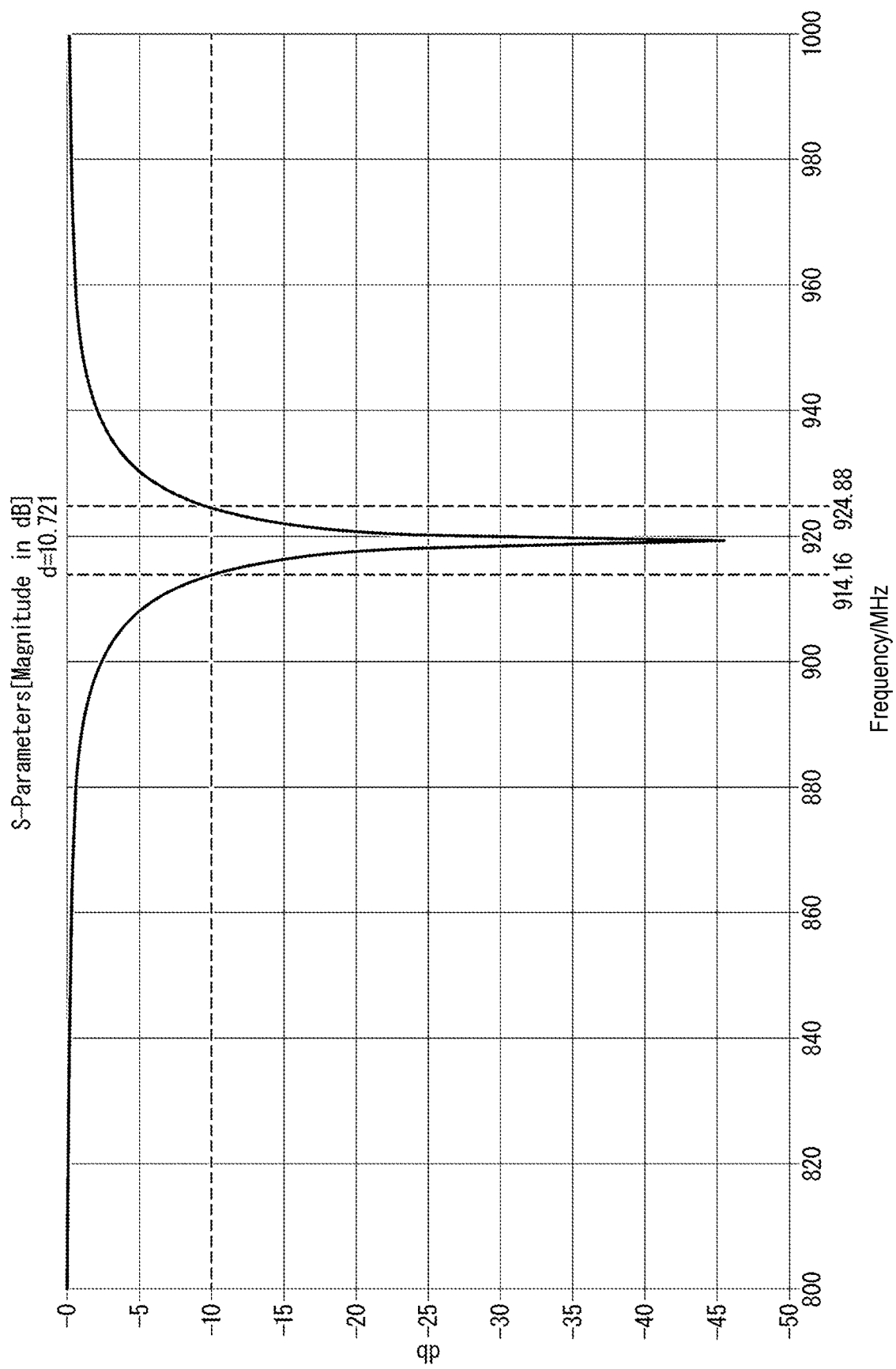
FIG. 11 is a diagram illustrating frequency response characteristics of a comparative wireless tag communication device.

FIG. 11 is a diagram illustrating frequency response characteristics of a wireless tag communication device having the comparative square patch antenna. FIG. 11 illustrates a range of approximately 10 MHz in width centered on 920 MHz where the S parameter S11 is −10 dB or less.

The results shown in FIGS. 9, 10 and 11 illustrate that the antenna 600 is an antenna having a wider band than the square patch antenna.

Here, the reason why the antenna 600 has a wider band than the square patch antenna will be explained. Hereinafter, for the sake of simplicity, when the first radiation region 711, the second radiation region 712, the third radiation region 721, the fourth radiation region 722, the first type additional region 713, and the second type additional region 723 are not distinguished, these regions are referred to as radiation regions. A radiation region in the radiation element 630 has a shape in which the length in the direction of a predetermined side is longer than the length in the direction of another side orthogonal to the predetermined side. That is, the shape of the radiation region has a longer side and a shorter side. Such a shape is similar to that of the antenna element. For that reason, each radiation region radiates a polarized wave whose polarization plane is parallel to the longer side of the radiation region and having a resonance frequency determined by the length of the longer side. Specifically, the resonance frequency is a frequency of a radio wave having a wavelength, a half of which is equal to the length of the longer side.

For example, the first radiation region 711 in FIG. 8 has a shape whose longer side is parallel to the X-axis and shorter side is parallel to the Y-axis. For that reason, the first radiation region 711 in FIG. 8 radiates the radio wave whose polarization plane is parallel to the X-axis and whose wavelength is equal to twice the length of the longer side of the first radiation region 711. For example, the third radiation region 721 in FIG. 8 has a shape whose longer side is parallel to the Y-axis and shorter side is parallel to the X-axis. For that reason, the third radiation region 721 in FIG. 8 radiates the radio wave whose polarization plane is parallel to the Y-axis and whose wavelength is equal to twice the length of the longer side of the third radiation region 721.

For that reason, the radiation element 630 having a plurality of shapes of radiation regions can radiate a plurality of types of radio waves having different combinations of polarization planes and wavelengths. That is, the antenna 600 can emit a radio wave of a wider band than an antenna having only a single shape of radiation region such as a square patch antenna, and can radiate a plurality of radio waves having different polarization planes unlike the antenna having only one type of radiation region.

In the radiation element 630, adjacent radiation regions whose longer sides are parallel are electrically connected by a part of radiation regions whose longer sides cross the longer sides of the adjacent radiation regions. For example, in FIG. 8, the first radiation region 711 and the second radiation region 712 are conducted by a part of the third radiation region 721, a part of the fourth radiation region 722, and a part of the second type additional radiation region 723 along the y-axis. Hereinafter, a radiation region positioned in the space between adjacent radiation regions whose longer sides are parallel and which conducts the adjacent radiation regions is referred to as a conducting region. For example, a part of the third radiation region 721 that conducts the first radiation region 711 and the second radiation region 712 along the y-axis is such a conducting portion.

For that reason, the first radiation region 711 and the second radiation region 712 can radiate not only the radio wave having a wavelength corresponding to the length of the longer side of each region but also the radio wave having a wavelength corresponding to the length of the longer side of a region obtained by adding the conducting portion to each region. For that reason, the antenna 600 can radiate the radio waves in a wider band than an antenna having just a plurality of types of radiation regions in a state where the plurality of radiation regions spatially separated from each other.

Furthermore, the antenna 600 can switch and radiate radio waves whose polarization planes are orthogonal to each other while having a structure in which a part of a plurality of radiation regions having longer sides extending towards different directions is shared. That is, the antenna 600 does not have a structure in which a plurality of radiation elements having longer sides extending towards different directions are spatially separated in order to radiate radio waves whose polarization planes are different. For that reason, the antenna 600 can reduce an occupancy area of the radiation element 630 for radiating radio waves having different polarization planes.

The wireless tag communication device 201 configured as described above includes the antenna 600 capable of radiating a plurality of types of polarized waves having a plurality of polarization planes or different frequencies. For that reason, the probability that the polarized wave radiated by the wireless tag communication device 201 is received by the radio tag is higher than the probability that the polarized wave radiated by a conventional device that radiates only one type of polarized wave is received by the radio tag. For that reason, the wireless tag communication device 201 can reduce the chance that information cannot be exchanged with the wireless tag due to the difference in the type of the wireless tag.

For that reason, the image forming apparatus 10 configured in this way can reduce the chance that information cannot be exchanged with the wireless tag due to the difference in the type of the wireless tag. This is not limited to the image forming apparatus 10, but the same applies to another sheet processing apparatus provided with the wireless tag communication device 201.

The image forming apparatus 10 may be a bar code printer used for managing a receipt and shipment of goods, or a reader that reads a sheet attached to goods displayed or sold in a retail store such as an apparel store. In such a case, the sheet provided with the wireless tag is a sheet or a tag attached to goods.

MODIFICATION EXAMPLE

One end of the longer side of the first radiation region 711 and one end of the longer side of the second radiation region 712 do not necessarily need to be aligned as illustrated in FIG. 8. That is, one end of the longer side of the first radiation region 711 and one end of the longer side of the second radiation region 712 may have a positional relationship as illustrated in FIG. 7. The same applies to the first type additional region 713. That is, one end of the longer side of the first radiation region 711 and one end of the longer side of the first type additional region 713 do not necessarily need to be aligned, and one end of the longer side of the second radiation region 712 and one end of the longer side of the first type additional region 713 do not necessarily need to be aligned.

When a plurality of first type additional regions exist, one end of the longer side of one first type additional region and one ends of the longer sides of other first type additional regions do not necessarily need to be aligned. However, when the ends are aligned, the effect that the gain is higher is obtained. When the ends are not aligned, the number of sides of the radiation region increases and the power is dispersed. For that reason, when the ends are not aligned, power flowing in the longer side direction is reduced as compared with the case where the ends are aligned. As described above, since the radiation region radiates the radio wave having the resonance frequency determined by the length of the longer side, the greater the power flowing in the longer side direction, the higher the gain can be obtained. For that reason, desirably, the ends are aligned rather than the ends are not aligned.

A distance between the radiation regions parallel to each other in the longer side direction is desirably within several mm. When the distance is within several mm, the same power flows through each radiation element, and the resonance frequency corresponding to each radiation region can be obtained at the same time. Therefore, a wider frequency band is supported by the wireless tag communication device 201.

One end of the longer side of the third radiation region 721 and one end of the longer side of the fourth radiation region 722 do not necessarily need to be aligned as illustrated in FIG. 8. That is, one end of the longer side of the third radiation region 721 and one end of the longer side of the fourth radiation region 722 may have a positional relationship as illustrated in FIG. 7. The same applies to the second type additional region 723. That is, one end of the longer side of the third radiation region 721 and one end of the longer side of the second type additional region 723 do not necessarily need to be aligned, and one end of the longer side of the fourth radiation region 722 and one end of the longer side of the second type additional region 723 do not necessarily need to be aligned. When a plurality of second type additional regions exist, one end of the longer side of one second type additional region and one ends of the longer sides of other second type additional regions do not necessarily need to be aligned. However, when the ends are aligned, the effect that the gain is higher is obtained. When the ends are not aligned, the number of sides of the radiation region increases and the power is dispersed. For that reason, when the ends are not aligned, power flowing in the longer side direction is reduced as compared with the case where the ends are aligned. As described above, since the radiation region radiates the radio wave having the resonance frequency determined by the length of the longer side, the greater the power flowing in the longer side direction, the higher the gain can be obtained. For that reason, desirably, the ends are aligned rather than the ends are not aligned.

The third length may be substantially the same as or different from either the first length or the second length. The fourth length may be substantially the same as or different from one which is either the first length or the second length and is not substantially the same as the third length. The first length means the length of the longer side of the first radiation region 711. The second length means the length of the longer side of the second radiation region 712. The third length means the length of the longer side of the third radiation region 721. The fourth length means the length of the longer side of the fourth radiation region 722.

The direction of the longer side of the radiation region does not necessarily need to be perpendicular or parallel to the sheet conveyance direction. The direction of the longer side of the radiation region may be perpendicular or parallel to a direction (hereinafter referred to as "reference direction") forming a predetermined angle with the sheet conveyance direction. For example, the X-axis direction in FIGS. 7 and 8 may be perpendicular to the reference direction, and the Y-axis direction in FIGS. 7 and 8 may be parallel to the reference direction.

Whether the wireless tag communication device 201 exchanges information with the wireless tag using the power-feeding lines 641 or 642 may be determined in advance by a user or may be determined by the wireless tag communication device 201 by executing a predetermined process. When the user makes such a determines in advance, for example, the user specifies one of the power-feeding lines 641 or 642, that radiates the polarized wave whose polarization plane is parallel to the direction of the wireless tag on the sheet to be processed, for information exchange.

When the wireless tag communication device 201 makes the determination, the following predetermined process is performed. For example, first, under the control of the wireless tag communication controller 501, the power-feeding lines 641, 642 to which the voltage is applied are switched at a predetermined cycle before exchanging information with the wireless tag. Then, each time the power-feeding lines 641, 642 are switched, radiation of the radio wave and intensity of a reflected wave by the wireless tag of the radio wave are measured. The wireless tag communication controller 501 determines the switching timing. The reflected wave is a radio wave radiated by the wireless tag. The wireless tag communication controller 501 measures the reflected wave. The wireless tag communication controller 501 ends the switching process at the timing when the reflected wave having predetermined intensity or higher is observed. The wireless tag communication controller 501 determines one of the power-feeding lines 641, 642, which was the target of voltage application at the time when the switching was completed, as the one to be used for exchanging information with the wireless tag.

The functions of the image forming apparatus 10 and/or the wireless tag communication controller 501 described above may be realized by a computer. In such a case, the functions may be implemented by a program(s) stored in a computer-readable recording medium, copied from the recording medium to a computer system, and executed by a processor or controller. A "computer system" as used herein includes an operating system (OS) and hardware such as peripheral devices. A "computer-readable recording medium" refers to a storage medium or device such as a portable medium such as a flexible disk, a magneto-optical disk, a ROM, or a CD-ROM, a hard disk built in the computer system, and the like. The "computer-readable recording medium" may be cloud-based system, a server, or client, and/or accessible via a communication line such as a network or the Internet or the like. . A program as-described above may be a program for performing only some parts of the functions described above, and some or all the functions may be performed in conjunction with a program already recorded in the computer system.

According to at least one embodiment described above, the risk that information cannot be exchanged with a wireless tag due to tag type incompatibilities, differences, or the like can be reduced by use of a wireless tag communication device corresponding to the wireless tag communication device 201.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device, comprising:
an antenna with a plurality of radiation regions through from which a polarized radio wave is emitted and including:
  a first radiation region extending along a first direction crossing a conveyance direction of a wireless tag that is conveyed by a conveyance mechanism and having a first length in the first direction,
  a second radiation region extending parallel to the first radiation region along the first direction and having a second length that is different from the first length in the first direction,
  a third radiation region extending along the conveyance direction and having a third length in the conveyance direction, and
  a fourth radiation region extending parallel to the third radiation region along the conveyance direction and having a fourth length that is different from the third length in the conveyance direction; and
a controller configured to cause at least one of the first, second, third, or fourth radiation regions to emit a polarized wave towards the wireless tag, wherein
each of the first and second radiation regions partially overlaps both the third radiation region and the fourth radiation region in a direction along which the polarized wave is emitted.

2. The wireless tag communication device according to claim 1, wherein each of the plurality of radiation regions has a rectangular shape.

3. The wireless tag communication device according to claim 1, wherein the plurality of radiation regions further include a fifth radiation region extending along the first direction and having a fifth length that is different from the first and second lengths in the first direction.

4. The wireless tag communication device according to claim 3, wherein the fifth radiation region partially overlaps both the third radiation region and the fourth radiation region.

5. The wireless tag communication device according to claim 3, wherein the plurality of radiation regions further include a sixth radiation region extending along the conveyance direction and having a sixth length that is different from the third and fourth lengths in the conveyance direction.

6. The wireless tag communication device according to claim 5, wherein the sixth radiation region partially overlaps each of the first, second, and fifth radiation regions in the direction along which the polarized wave is emitted.

7. The wireless tag communication device according to claim 1, wherein one side of each of the first and second radiation regions is aligned along the conveyance direction.

8. The wireless tag communication device according to claim 7, wherein one side of each of the third and fourth radiation regions is aligned along the first direction.

9. The wireless tag communication device according to claim 1, wherein
the antenna further includes a first contact through which power is supplied, and
the first contact is disposed on a portion of one of the plurality of radiation regions that overlaps another one of the plurality of radiation regions.

10. The wireless tag communication device according to claim 9, wherein
the antenna further includes a second contact through which power is supplied, and
the second contact is disposed on a portion of different one of the plurality of radiation regions from the one of the plurality of radiation regions on which the first contact is disposed.

11. A sheet processing apparatus, comprising:
a sheet conveyance path configured to convey a sheet having a wireless tag; and
a wireless tag communication device configured to communicate with the wireless tag and including:
an antenna with a plurality of radiation regions from which a polarized radio wave is emitted and including:
a first radiation region extending along a first direction perpendicular to a conveyance direction of the wireless tag along the conveyance path and having a first length in the first direction,
a second radiation region extending parallel to the first radiation region along the first direction and having a second length that is different from the first length in the first direction,
a third radiation region extending along the conveyance direction and having a third length in the conveyance direction, and
a fourth radiation region extending parallel to the third radiation region along the conveyance direction and having a fourth length that is different from the third length in the conveyance direction, and
a controller configured to cause at least one of the first, second, third and, fourth radiation regions to emit a polarized wave toward the wireless tag, wherein
each of the first and second radiation regions partially overlaps both the third radiation region and the fourth radiation region in a direction along which the polarized wave is emitted.

12. The sheet processing apparatus according to claim 11, wherein each of the plurality of radiation regions has a rectangular shape.

13. The sheet processing apparatus according to claim 11, wherein the plurality of radiation regions further include a fifth radiation region extending along the first direction and having a fifth length that is different from the first and second lengths in the first direction.

14. The sheet processing apparatus according to claim 13, wherein the fifth radiation region partially overlaps both the third radiation and the fourth radiation region.

15. The sheet processing apparatus according to claim 13, wherein the plurality of radiation regions further include a sixth radiation region extending along the conveyance direction and having a sixth length that is different from the third and fourth lengths in the conveyance direction.

16. The sheet processing apparatus according to claim 15, wherein the sixth radiation region partially overlaps each of the first, second, and fifth radiation regions in the direction along which the polarized wave is emitted.

17. The sheet processing apparatus according to claim 11, wherein one side of each of the first and second radiation regions is aligned along the conveyance direction.

18. The sheet processing apparatus according to claim 17, wherein one side of each of the third and fourth radiation regions is aligned along the first direction.

19. The sheet processing apparatus according to claim 11, wherein
the antenna further includes a first contact through which power is supplied, and
the first contact is disposed on a portion of one of the plurality of radiation regions that overlaps another one of the plurality of radiation regions.

20. An antenna for a wireless tag communicating device configured to communicate with a wireless tag conveyed by a conveyance mechanism, the antenna comprising:
a plurality of radiation regions from which a polarized radio wave is emitted, the plurality of radiation regions including:
a first radiation region extending along a first direction perpendicular to a conveyance direction of the wireless tag and having a first length in the first direction,
a second radiation region extending parallel to the first radiation region along the first direction and having a second length that is different from the first length in the first direction,
a third radiation region extending along the conveyance direction and having a third length in the conveyance direction, and
a fourth radiation region extending parallel to the third radiation region along the conveyance direction and having a fourth length that is different from the third length in the conveyance direction, wherein
each of the first and second radiation regions partially overlaps both the third radiation region and the fourth radiation region in a direction along which the polarized wave is emitted.

* * * * *